US012628257B2

(12) United States Patent
Ma

(10) Patent No.: US 12,628,257 B2
(45) Date of Patent: May 12, 2026

(54) LIGHT DIMMER FOR SMART HOMES

(71) Applicant: Chengli Li, Suzhou (CN)

(72) Inventor: Ke Ma, Suzhou (CN)

(73) Assignee: Chengli Li, Suzhou (CN)

( * ) Notice: Subject to any disclaimer, the term of this patent is extended or adjusted under 35 U.S.C. 154(b) by 151 days.

(21) Appl. No.: 18/538,976

(22) Filed: Dec. 13, 2023

(65) Prior Publication Data

US 2025/0081312 A1 Mar. 6, 2025

(30) Foreign Application Priority Data

Aug. 29, 2023 (CN) ......................... 202311099437.0

(51) Int. Cl.
*H05B 47/13* (2020.01)
*H05B 47/16* (2020.01)

(52) U.S. Cl.
CPC ............. *H05B 47/13* (2020.01); *H05B 47/16* (2020.01)

(58) Field of Classification Search
CPC ........ H05B 47/13; H05B 47/115; Y02B 20/40
USPC ....................................................... 340/686.6
See application file for complete search history.

(56) References Cited

U.S. PATENT DOCUMENTS

| | | | | |
|---|---|---|---|---|
| 7,028,912 | B1 * | 4/2006 | Rosen | G05D 23/1905 236/94 |
| 9,544,977 | B2 * | 1/2017 | Economy | H04W 4/70 |
| 9,655,217 | B2 * | 5/2017 | Recker | H02J 9/02 |
| 10,405,412 | B2 * | 9/2019 | Mason | H05B 47/19 |
| 10,627,791 | B2 * | 4/2020 | Fadell | G05D 23/1919 |
| 10,834,796 | B2 * | 11/2020 | Magielse | H05B 47/115 |
| 11,236,923 | B2 * | 2/2022 | Heintzelman | F24F 11/61 |
| 11,765,809 | B2 * | 9/2023 | Pessina | H05B 47/1965 700/295 |
| 2019/0037673 | A1 * | 1/2019 | Pessina | H05B 47/195 |
| 2019/0230769 | A1 * | 7/2019 | Magielse | H05B 47/115 |
| 2019/0320515 | A1 * | 10/2019 | Sadwick | F21V 23/0471 |
| 2020/0404767 | A1 * | 12/2020 | Economy | H05B 47/19 |

* cited by examiner

*Primary Examiner* — Eric Blount
(74) *Attorney, Agent, or Firm* — Chen Yoshimura LLP

(57) ABSTRACT

A light dimmer for smart homes includes a proximity switch for sensing whether a person is approaching a target area, and outputting sensing information in response to the sensing result; a controller connected to the proximity switch for generating a first control signal based on the sensing information; a display coupled to the controller, for generating a display based on the first control signal; a light dimming unit coupled to the controller, for adjusting the brightness of the illumination load based on a second control signal generated by the controller. This system is suitable for use in smart homes. By providing the proximity switch and the display, it can meet multifunctional needs of smart homes and enhance user experience.

11 Claims, 4 Drawing Sheets

LIGHT DIMMER FOR SMART HOMES

BACKGROUND OF THE INVENTION

This invention relates to light illumination, and in particular, it relates to light dimmer device and system for smart homes for adjusting illumination.

Conventional dimmers can be divided into press-button type, touch type, and knob type dimming adjustment, etc. They can also be divided based on operating principles into analog dimmer, timer dimmer, PWM (pulse width modulation) pulse width dimmer, thyristor (or silicon-controller rectifier, SCR) dimmer, etc. A common knob type silicon-controller rectifier dimmer changes the resistance value of the adjustable resistor by turning the knob, thereby changing the conduction angle of the SCR and achieving dimming of the lighting load.

FIG. 1 is a block diagram of an exemplary conventional dimmer system 100, which includes a dimming circuit 110, a main control module 120, a signal triggering module 130, and an AC-to-DC (alternating current to direct current) converter circuit 140. The input end of the AC-to-DC converter circuit 140 is connected to the hot line L and the neutral line N of the power source, and the output end is connected to the main control module 120. The main control module 120 is coupled to the signal triggering module 130 and the dimming circuit 110. The input and output terminals of the dimming circuit 110 are connected to the hot line. The dimming system 100 converts the alternating current between the hot and neutral lines into direct current through the AC-to-DC conversion circuit 140 and inputs it into the main control module 120. The main control module 120 receives the trigger signal from the signal triggering module 130 and generates a control signal to control the dimming circuit, thereby changing the brightness of the lighting load 150.

However, conventional dimmers have certain shortcomings, such as: limited lifespan of the adjustable resistors and limited number of rotations of knobs; lack of tactile feedback, leading to poor user experience; inability to remotely intelligently set and control the system, for example, inability to set multiple working modes; inability to display current load brightness and weather related information; lack of automatic night compensation function, etc.

SUMMARY OF THE INVENTION

To address at least some of the aforementioned issues and defects, the present invention proposes a novel intelligent dimmer.

In one aspect, the present invention provides a light dimmer for smart homes, which includes: a proximity switch, configured to sense whether a person is approaching a target area and outputting sensing information in response to a sensing result; a controller coupled to the proximity switch, configured to generate a first control signal based on the sensing information; a display coupled to the controller, configured to generate a display based on the first control signal; and a dimming unit coupled to the controller, configured to adjust a brightness of a lighting load based on a second control signal generated by the controller.

The light dimmer is suitable for use in smart homes. In smart home use scenarios, by providing the proximity switch and the display, it can meet multifunctional needs of smart homes and enhance user experience.

In some embodiments, the light dimmer further includes: a rotary encoder, configured to generate encoding signals, wherein the controller is coupled to the rotary encoder and configured to generate the second control signal based on the encoding signal.

In some embodiments, the controller includes a timer, wherein the controller is further configured to light up the display in response to the encoding signal and reset the timer, and to control the display to enter energy-saving mode when the timer reaches a preset delay time.

In some embodiments, the controller includes a timer, and wherein the controller is further configured to light up the display in response to the sensing information and reset the timer, and to control the display to enter energy-saving mode when the timer reaches a preset delay time.

In some embodiments, the controller is communicatively coupled to a mobile terminal and configured to generate the second control signal based on control information received from the mobile terminal.

In some embodiments, in an out-of-home mode, the controller is further configured to send reminder information to the mobile terminal based on the sensing information.

In some embodiments, the proximity switch includes an infrared emitter and an infrared receiver.

In some embodiments, the dimming unit includes an analog dimming circuit, a timer dimming circuit, a PWM (pulse width modulation) pulse width dimming circuit, or a thyristor dimming circuit.

In some embodiments, the display displays information including current brightness information of the load, time information, weather information, and/or network status information.

In some embodiments, the light dimmer further includes: a wireless communication unit configured wirelessly communicate between the controller and a mobile terminal; an AC-to-DC (alternating current to direct current) converter, configured to convert an input current voltage into a first voltage to supply power to the controller; and a DC-to-DC (direct current to direct current) converter, coupled to the AC-to-DC converter, configured to convert the first voltage into a second voltage to power the wireless communication unit.

BRIEF DESCRIPTION OF DRAWINGS

Other features and advantages of the present invention may be understood from the embodiments described below with reference to the drawings.

DETAILED DESCRIPTION OF THE INVENTION

Preferred embodiments of the present and their applications are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

Figure 1:
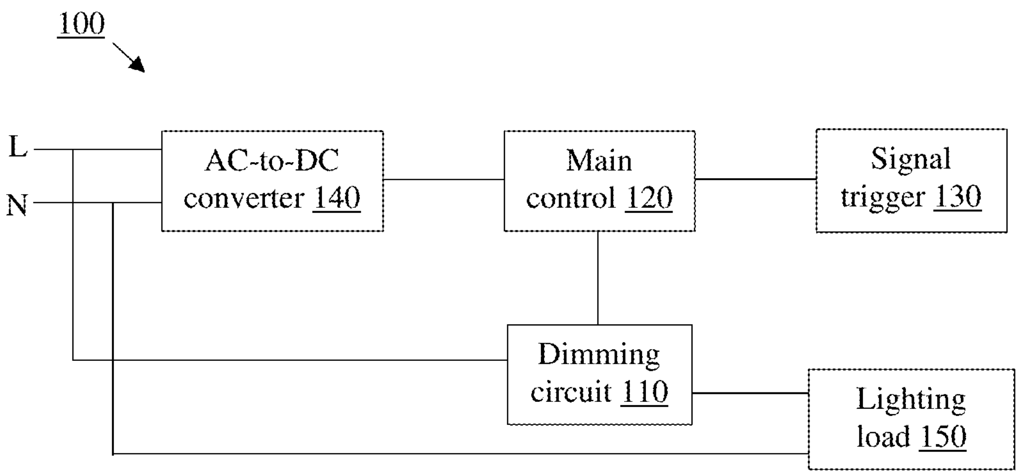
FIG. 1 is a block diagram showing a conventional light dimmer system.
Figure 2:
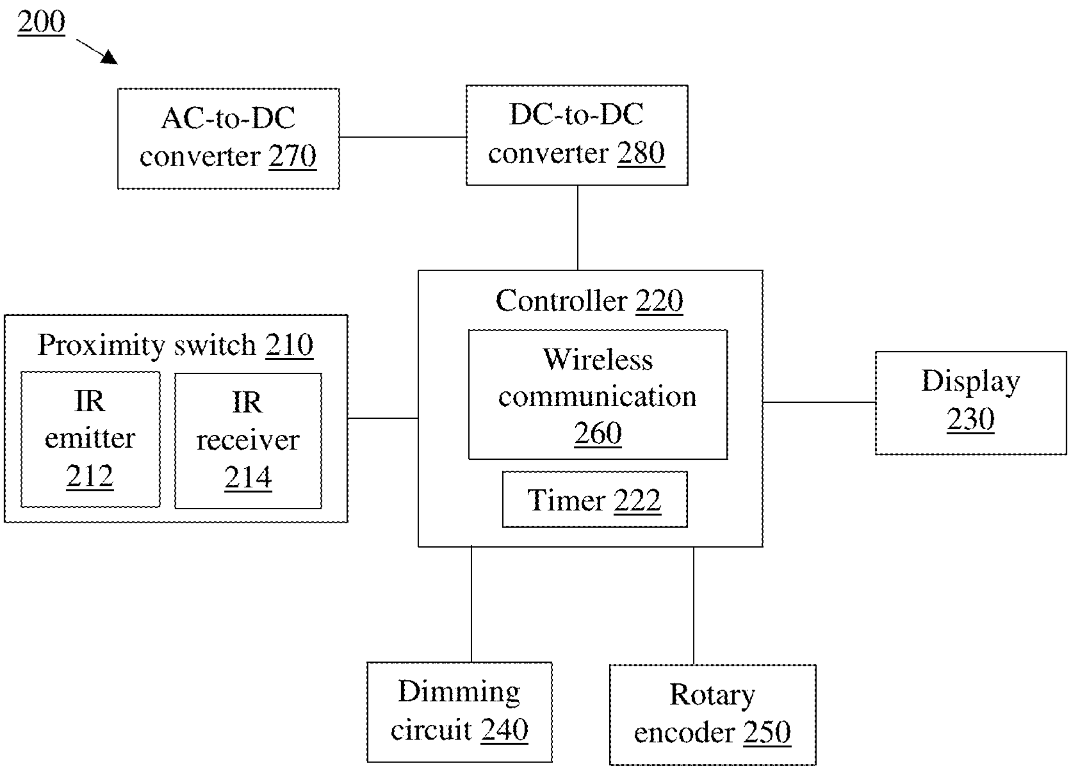
FIG. 2 schematically illustrates a light dimmer according to an embodiment of the present invention.

FIG. 2 schematically illustrates a dimmer 200 for smart homes according to an embodiment of the present invention. The dimmer 200 includes a proximity switch 210, a controller 220, a display 230, and a dimming unit 240. The proximity switch 210 is configured to sense whether a person is approaching the target area, and to output sensing information in response to the sensing result being affirmative. The controller 220 is coupled to the proximity switch 210 for generating a first control signal based on the sensing information output by the proximity switch 210. The display 230 is coupled to the controller 220 and configured to generate a display based on the first control signal from the controller 220. The dimming unit 240 is coupled to the controller 220, and configured to adjust the brightness of the lighting load based on the second control signal generated by the controller 220.

More specifically, when the proximity switch 210 detects that a person is entering the sensing range or detects a hand waving motion or other gesture by a person, it outputs corresponding sensing information. The controller 220 generates a first control signal based on the sensing information received from the proximity switch 210, and sends the first control signal to the display 230 to generate a display. The display 230 generates the display based on the first control signal from the controller 220. The display may be light emission (to allow users to perform dimming control or other operations), display of current brightness information of the load, time information, weather information, and/or network status information, etc. Preferably, the display 230 employs a liquid crystal display screen, which has the advantages of large information display capacity, low power consumption, long service life, and no radiation or pollution, etc. and is particularly suitable for use in smart homes. The dimming unit 240 may employed analog dimming circuits, timer dimming circuits, PWM pulse width dimming circuits, or SCR dimming circuits.

In some embodiments, the dimmer 200 also includes a rotary encoder 250. The rotary encoder 250 is used to generate encoding signals. The controller 220 is coupled to the rotary encoder 250 and obtains rotation direction information and rotation displacement information based on the encoding signal (which can be two square wave signals), and generates a second control signal based thereon. The dimming unit 240 adjusts the brightness of the lighting load based on the second control signal. Many conventional dimmers use adjustable resistors (such as potentiometers) for dimming, which have a maximum rotation position, have limited adjustment accuracy, and may produce flickers in the dimming process. In embodiments of the present invention, by using a rotary encoder, the dimmer can achieve continuous load adjustment, no maximum adjustment position, and higher adjustment accuracy. Moreover, the encoder achieves adjustment by outputting pulse signals, resulting in finer dimming and without flickering, providing a better user experience.

In some embodiments, the controller 220 includes a timer 222. In response to the encoding signal generated by the rotary encoder 250, the controller 220 lights up the display 230 and resets the timer 222, and then controls the display 230 to enter energy-saving mode (such as screen light off) when the timer 222 reaches a preset delay time. In other embodiments, in response to sensing information from the proximity switch 210, the controller 220 lights up the display 230 and resets the timer 222, and then controls the display 230 to enter energy-saving mode (such as screen light off) when the timer 222 reaches a preset delay time.

In some embodiments, the controller 220 communicates with mobile terminals (mobile smart phone, tablet, computer, etc.) to generate a second control signal based on the control information sent by the mobile terminal. The dimming unit 240 adjusts the brightness of the lighting load based on the second control signal. The mobile terminal can achieve remote control of the dimmer 200, such as adjusting the brightness of the load, switching the load on and off, setting the time period for turning the load on and off, selecting or customizing the working modes, and setting the display theme, etc. The mobile terminal transmits control commands to the controller 220, and the latter generates corresponding control signals based on the received control commands to control each unit in the dimmer (such as controlling the display brightness of the display, controlling the dimming unit to adjust the brightness of the load, etc.).

In some embodiments, when the controller 220 receives both the control command from the mobile terminal and the encoding signal generated by the rotary encoder, the controller 220 generates the second control signal (i.e. a signal for controlling the dimming unit 240) based on the encoding signal. In this example, the priority level of the encoding signal of the rotary encoder is higher than the priority level of the control instructions on the mobile user end.

In some embodiments, the mobile terminal achieves remote intelligent control of the dimmer through an application (APP). In some embodiments, the dimmer 200 supports the Matter protocol, which is conducive to achieving smoother communication and cooperation between different smart home devices, facilitating joint control, and strengthening the protection of user privacy.

In some embodiments, the operation modes of the dimmer 200 include an out-of-home mode. When the dimmer 200 operates in the out-of-home mode, the controller 220 sends corresponding reminder information to the mobile user terminal based on the sensing information (such as there is someone at home, nobody at home but some lights are not turned off, etc.).

In some embodiments, the light dimmer 200 includes a wireless communication unit 260, through which the controller 220 is communicatively coupled to the mobile terminal. The wireless communication unit 260 can be an independent communication unit or integrated into the controller 220. The wireless communication unit 260 can be a WiFi communication unit.

In some embodiments, the dimmer 200 includes an AC-to-DC converter circuit 270 and a DC-to-DC (direct current to direct current) converter circuit 280. The AC-to-DC converter 270 converts the voltage of the power source (the grid) into a first voltage. The DC-to-DC converter 280 is connected to the AC-to-DC converter 270, to convert the first voltage into a second voltage to supply power to the controller 220 including the wireless communication unit 260 in the dimmer. The wireless communication unit 260 is used to communicate between the controller 220 and the mobile terminal.

In some embodiments, the proximity switch 210 includes an infrared emitter 212 and an infrared receiver 214, which senses the presence of a human body in the target area using infrared encoding and decoding, to detect whether a person is approaching or whether there is arm waving motion, and to output corresponding sensing information. Based on the sensing information, the controller 220 determines whether to wake up the display.

Figure 3:
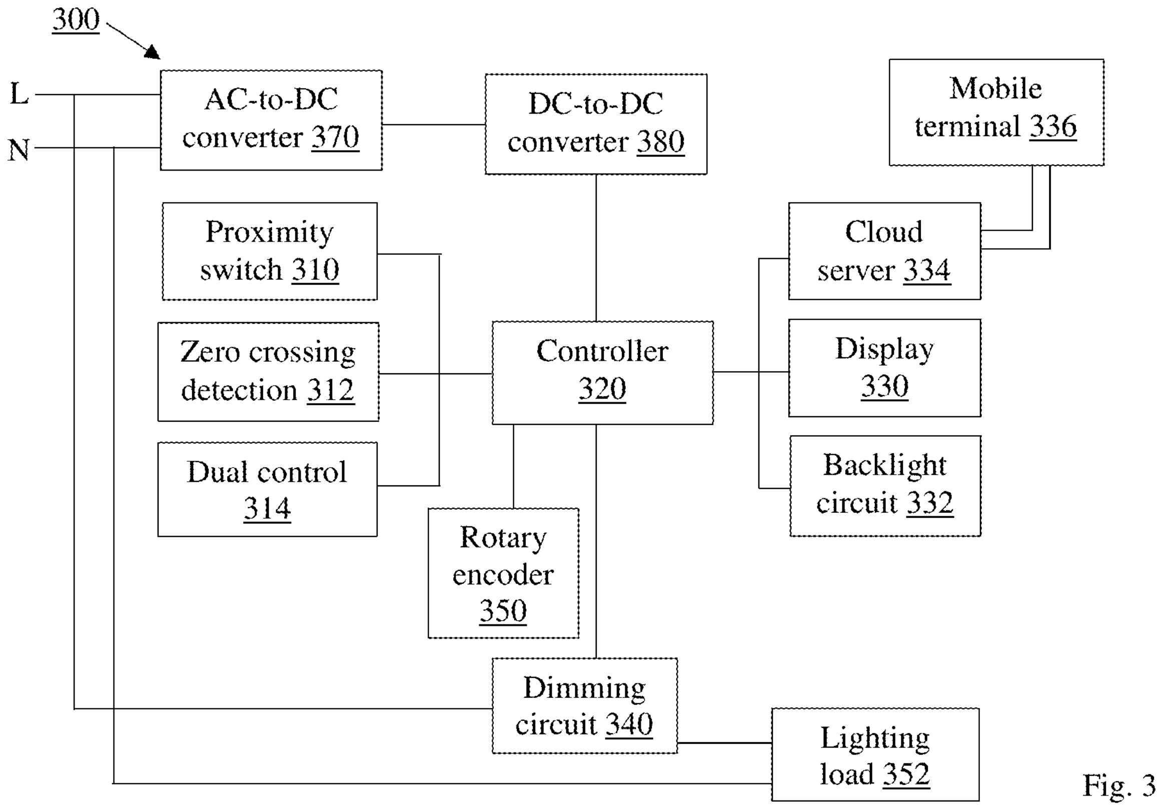
FIG. 3 is a block diagram illustrating a light dimmer system according to an embodiment of the present invention.

FIG. 3 is a block diagram illustrating a light dimmer system according to an embodiment of the present invention. As shown in FIG. 3, the dimming system 300 includes a proximity switch 310, a controller 320 (including wireless communication unit, such as Wifi communication unit), a display 330, a dimming unit 340, a rotary encoder 350, an AC-to-DC converter 370 and DC-to-DC converter 380, a zero crossing detection circuit 312, a dual control circuit 314, a backlight circuit 332, a cloud server 334, and mobile terminal 336.

More specifically, the input end of the AC-to-DC converter 370 is coupled to the hot wire L and the neutral wire N, and converts AC power into DC power and outputs it to the DC-to-DC converter 380. The DC-to-DC converter 380 converts the DC voltage into a voltage range required by the controller 320. The proximity switch 310 includes an infrared emitter and an infrared receiver, to detect whether there is a person or a waving movements at a certain distance in front of the device (i.e. within a target area). The zero crossing detection circuit 312 monitors the voltage change of the AC power, and outputs a zero crossing detection signal to the controller 320 when the AC voltage crosses zero. The controller 320 controls the dimming unit 340 based on the zero crossing detection signal. After the display 330 (which may include a liquid crystal display screen) is turned off, when the proximity switch 310 detects a person or a waving motion in the target area, the liquid crystal display screen is automatically lit up. The dual control circuit 314 detects the presence of a dual control signal and can be used to control a lighting load (lamp) with multiple switches. The display 330 may be implemented with a thin film transistor (TFT) liquid crystal display screen to display the current lighting brightness value, weather and time in the current region, and network status. The backlight circuit 332 may use an LED backlight display module. The rotary encoder 350 is physically coupled to the knob (not shown), and when the knob is rotated, it drives the rotary encoder 350 to rotate, generating the encoding signal. The controller 320 detects the encoding signal and determines the magnitude of the brightness increase or decrease, and then controls the dimming unit 340 to adjust the lighting load 352 to achieve the adjusted brightness. In some embodiments, the controller 320 includes a microcontroller unit (MCU) and a WiFi communication unit, and is connected to the cloud server 334 via the WiFi communication unit and a router. The mobile terminal 336 (such as a mobile phone) can control the entire dimming system using an application program (App), including dimming brightness, minimum dimming brightness value, timed on/off, and backlight indicator brightness and other related information.

Figure 4:
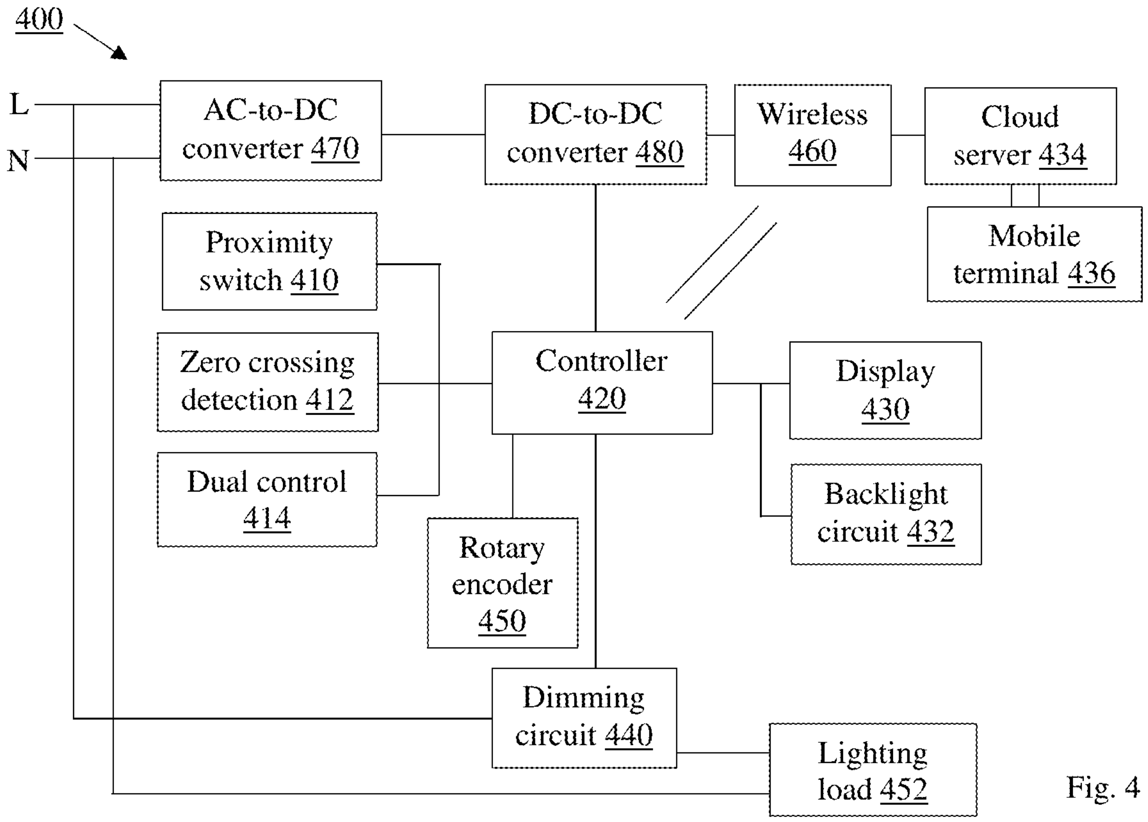
FIG. 4 is a block diagram illustrating a light dimmer system according to another embodiment of the present invention.

FIG. 4 is a block diagram illustrating a light dimmer system according to another embodiment of the present invention. As shown in FIG. 4, the dimming system 400 includes a proximity switch 410, a controller 420, a display 430, a dimming unit 440, a rotary encoder 450, an AC-to-DC converter 470 and a DC-to-DC converter 480, a zero crossing detection circuit 412, a dual control circuit 414, a backlight circuit 432, a wireless communication unit 460 (such as Wifi communication unit), a cloud server 434 and mobile terminal 436. The dimming system 400 adjusts the lighting brightness of the lighting load 452. A difference between the dimming system 400 in this embodiment and the dimming system 300 of FIG. 3 is that the in the dimming system 400, the controller 420 and the wireless communication unit 460 (e.g., a Wifi communication unit) are independent of each other, while in the dimming system 300, the controller 320 is a module that incorporates wireless communication function.

Figure 5A:
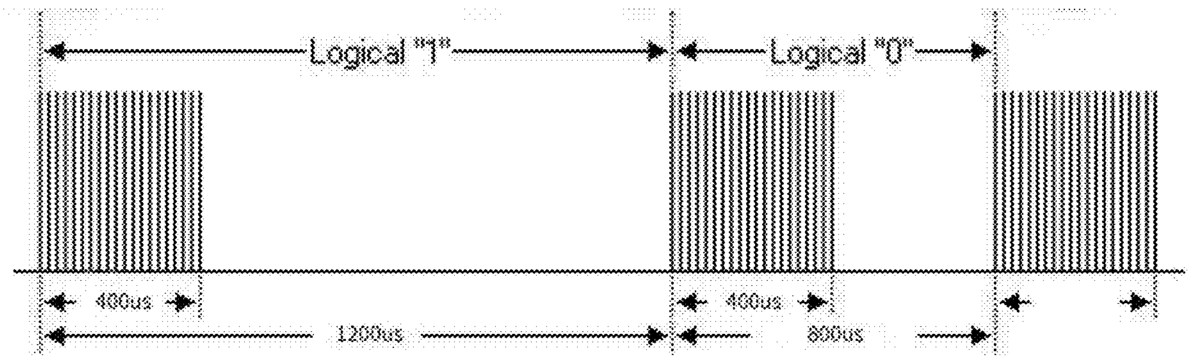
FIGS. 5A and 5B illustrate a coding scheme for a proximity switch according to an embodiment of the present invention.
Figure 5B:
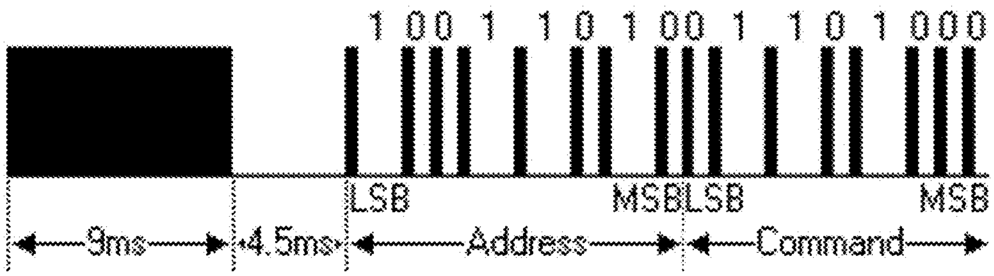

FIGS. 5A and 5B illustrate a coding scheme for an infrared proximity switch (which includes an infrared emitting tube and an infrared receiving tube) according to an embodiment of the present invention. As shown in FIGS. 5A and 5B, Logical 1 is 1200 μs in total duration with pulse time 400 μs (pulse time is the time duration containing a series of pulses); Logical 0 is 800 μs in total duration with pulse time 400 μs. Decoding is based on the duration of the pulse time, starting with a 9 ms time period of high-level pulsed signal, followed by a 4.5 ms low-level signal (i.e. without pulses), followed by an 8-bit address code (starting from the lease significant bit), and finally an 8-bit command code (starting from the least significant bit). The infrared proximity switch repeats the above transmission sequence during operation, and only data containing specific commands and address codes is received, which is considered a valid reception.

Figure 6:
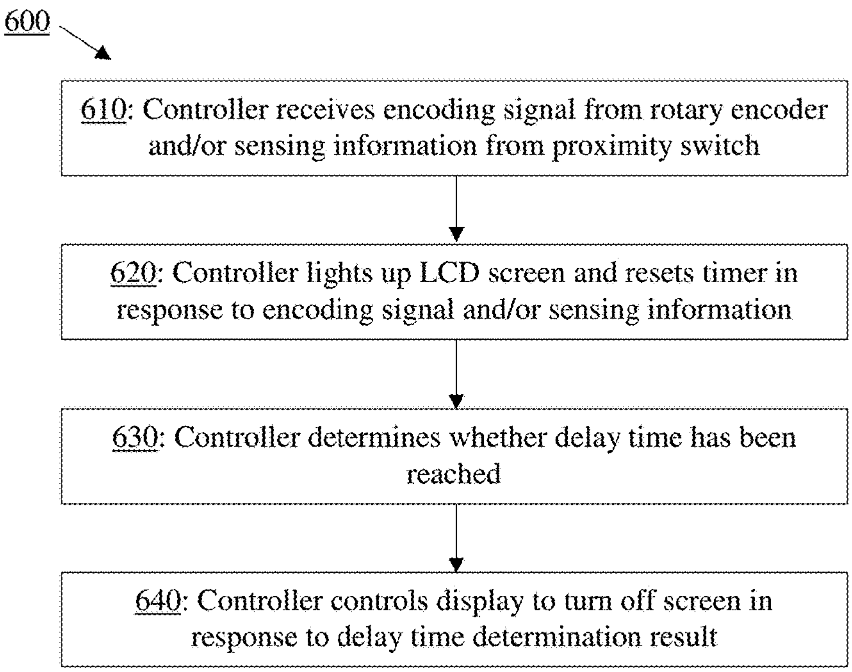
FIG. 6 is a partial flow chart showing the operation of a light dimmer according to an embodiment of the present invention.

FIG. 6 is a partial flow chart showing the operation of a light dimmer according to an embodiment of the present invention. As shown in FIG. 6, the partial workflow 600 includes the following. In step 610, the controller receives the encoding signal from the rotary encoder and/or the sensing information from the proximity switch. In step 620, in response to the received encoding signal and/or sensing information, the controller lights up the LCD screen and resets the timer. In step 630, the controller determines whether the delay time has been reached. In step 640, in response to the determination result of the delay time, the controller controls the display to turn off the screen.

Figure 7A:
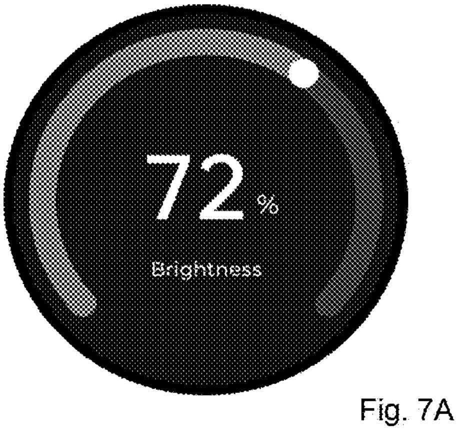
FIG. 7A illustrates a display interface of a light dimmer according to an embodiment of the present invention.
Figure 7B:
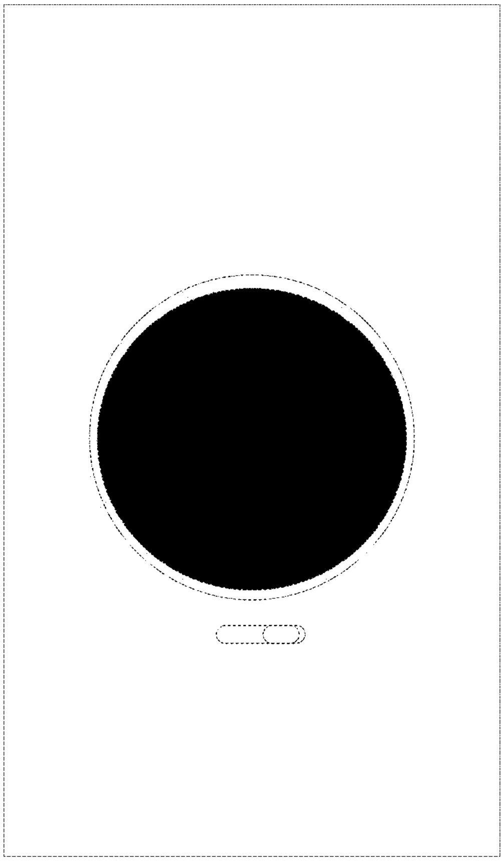
FIG. 7B illustrates an exterior view of a light dimmer according to an embodiment of the present invention.

FIGS. 7A and 7B respectively illustrate a display interface and an exterior view of a light dimmer according to an embodiment of the present invention, showing the LCD display interface in a dimming mode. When the large knob (the middle circle) is pressed, the lighting load is turned on. Turning the knob left and right adjusts the lighting brightness. The adjustable brightness range is from the minimum brightness value to the maximum brightness value set by the user.

While the present invention is described above using specific examples, these examples are only illustrative and do not limit the scope of the invention. It will be apparent to those skilled in the art that various modifications, additions and deletions can be made to the light dimmer device and system of the present invention without departing from the spirit or scope of the invention.

The invention claimed is:

1. A light dimmer for smart homes, comprising:

a proximity switch, configured to sense whether a person is approaching a target area and outputting sensing information in response to a sensing result;

a controller coupled to the proximity switch, configured to generate a first control signal based on the sensing information;

a display coupled to the controller, configured to generate a display based on the first control signal; and a dimming unit coupled to the controller, configured to adjust a brightness of a lighting load based on a second control signal generated by the controller, wherein the controller is communicatively coupled to a mobile terminal and configured to generate the second control signal based on control information received from the mobile terminal, and wherein in an out-of-home mode, the controller is further configured to send reminder information to the mobile terminal based on the sensing information.

2. The light dimmer of claim 1, wherein the display is an information display.

3. The light dimmer of claim 2, further comprising:

a rotary encoder, configured to generate encoding signals;

wherein the controller is coupled to the rotary encoder and configured to generate the second control signal based on the encoding signal.

4. The light dimmer of claim 3, wherein the controller includes a timer, and wherein the controller is further configured to light up the information display in response to the encoding signal and reset the timer, and to control the information display to enter energy-saving mode when the timer reaches a preset delay time.

5. The light dimmer of claim 2, wherein the controller includes a timer, and wherein the controller is further configured to light up the information display in response to the sensing information and reset the timer, and to control the information display to enter energy-saving mode when the timer reaches a preset delay time.

6. The light dimmer of claim 2, wherein the controller is communicatively coupled to a mobile terminal and configured to generate the second control signal based on control information received from the mobile terminal.

7. The light dimmer of claim 2, wherein the proximity switch includes an infrared emitter and an infrared receiver.

8. The light dimmer of claim 2, wherein the dimming unit includes an analog dimming circuit, a timer dimming circuit, a PWM (pulse width modulation) pulse width dimming circuit, or a thyristor dimming circuit.

9. The light dimmer of claim 2, wherein the information display displays information including current brightness information of the load, time information, weather information, and/or network status information.

10. The light dimmer of claim 2, further comprising:

a wireless communication unit configured wirelessly communicate between the controller and a mobile terminal;

an AC-to-DC (alternating current to direct current) converter, configured to convert an input current voltage into a first voltage; and a DC-to-DC (direct current to direct current) converter, coupled to the AC-to-DC converter, configured to convert the first voltage into a second voltage to power the controller and the wireless communication unit.

11. The light dimmer of claim 2, wherein the information display is a liquid crystal display (LCD) device.

* * * * *